Dec. 24, 1940.   M. L. ECKMAN   2,225,862
METHOD OF MAKING FLUID CONDUITS
Original Filed Feb. 23, 1937
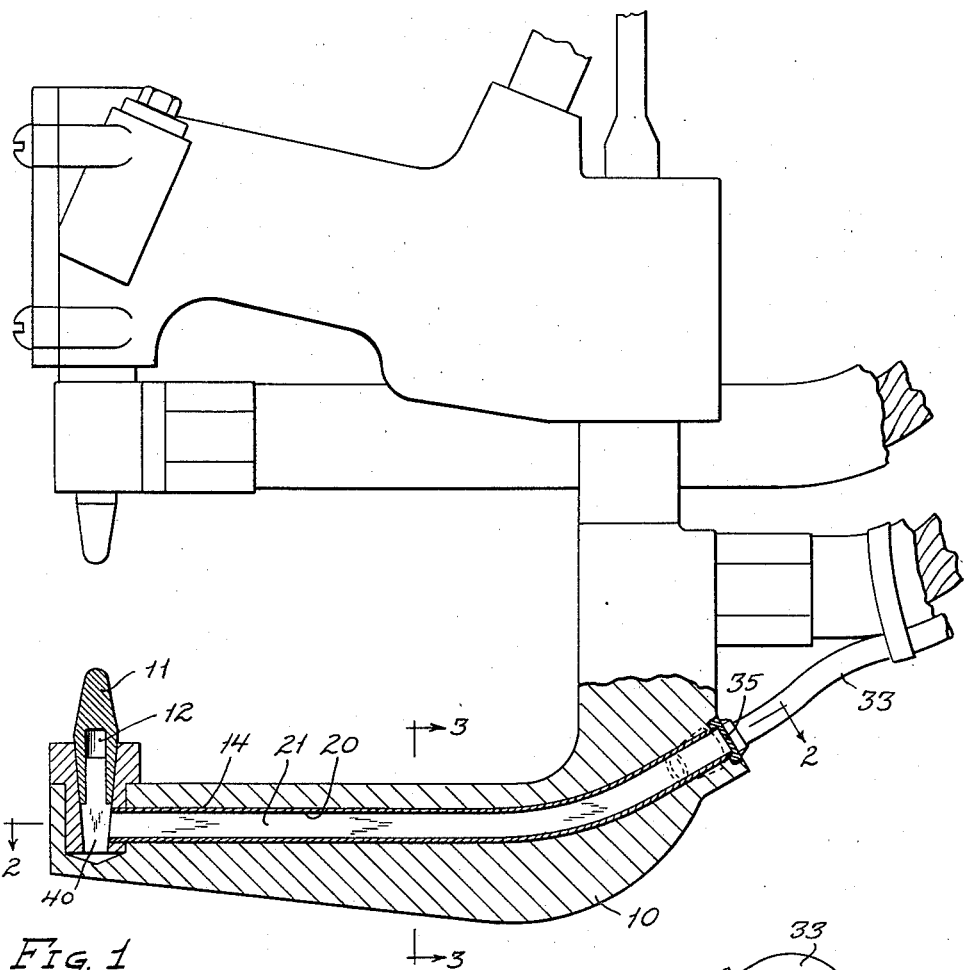
Fig. 1
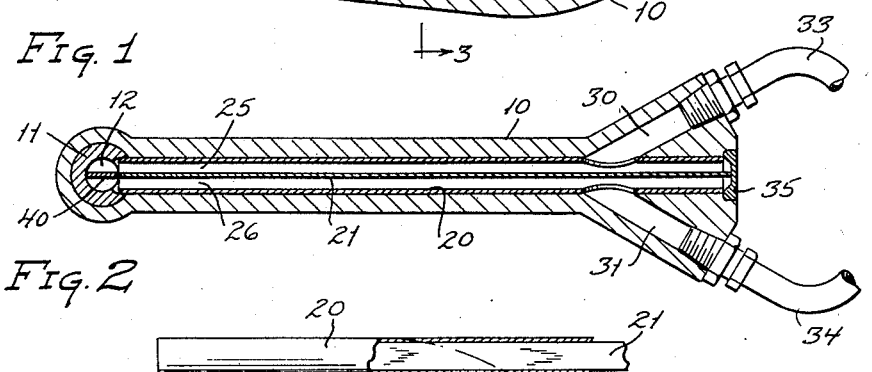
Fig. 2
Fig. 4
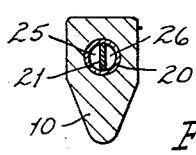
Fig. 3
INVENTOR.
MERIL L. ECKMAN
BY Bates, Goldrick, & Teare
ATTORNEYS Patented Dec. 24, 1940

2,225,862

UNITED STATES PATENT OFFICE 2,225,862

METHOD OF MAKING FLUID CONDUITS

Meril L. Eckman, Cleveland, Ohio, assignor to The American Coach & Body Co., Cleveland, Ohio, a corporation of Ohio Original application February 23, 1937, Serial No. 126,996. Divided and this application September 3, 1938, Serial No. 228,288

2 Claims. (Cl. 29—157)

This invention relates to a method of making an improved conduit. More particularly this invention relates to an improved conduit for facilitating the circulation of a cooling medium in an electric welding tool or the like, and the method of making such conduits. These, therefore, are the general objects of the present invention. This application is a division of my copending application Serial No. 126,996, filed February 23, 1937, which has since become embodied in Patent No. 2,134,110, on October 25, 1938.

Electric welding tools and mechanism generally comprise ferrous castings in the form of frames which support the welding electrodes. The electrodes used are generally hollow and are in communication with cored passageways in the castings. One of these passageways admits cooling fluid to the electrode, while the other permits the fluid to leave the tool. The walls of these passageways are subject to corrosion which tends to obstruct the circulation of the cooling fluid, sometimes entirely stopping such circulation. Likewise, minute flaws, crevices and pin holes, which at first are too minute to be observed or even to permit the seepage of the cooling medium therethrough, sometimes open or become enlarged from the strains set up in the metal structure as a result of constant heating and cooling of the tool.

It is a more specific object of the present invention to provide a conduit which may be readily inserted in suitable preformed passageways in the frame of a welding tool apparatus, and which will overcome the disadvantages of the passageway above set out. In this connection my invention embodies a conduit which may be economically manufactured.

Another object of the present invention is to provide a tubular conduit having two independent passageways therethrough, and to provide a simple and economical method of manufacturing such a conduit.

Other objects of the present invention will become more apparent from the following description, reference being had to the accompanying drawing in which I illustrate a preferred form of my invention.

In the drawing, Fig. 1 is a side elevation partially in section of a welding tool, illustrating my improved conduit in use therewith, portions of the tool and conduit having been broken away to more clearly illustrate the construction thereof; Fig. 2 is a sectional detail, taken along the offset lines 2—2 of Fig. 1; Fig. 3 is a transverse section, as indicated by the line 3—3 on Fig. 1; Fig. 4 is a view of my improved conduit, partially broken away, to more clearly illustrate the internal construction thereof.

Referring now to the drawing, I have illustrated in Fig. 1 my improved conduit in connection with an electric welding tool. The tool illustrated comprises a frame 10, carrying an electrode 11. The electrode is hollow and the opening 12 therein is in communication with a passageway 14 formed in the frame. In the construction illustrated, but one passageway 14 is provided, but by the use of my improved conduit or liner this passageway serves both to conduct the cooling fluid to the electrode in one stream and to conduct such cooling fluid from the electrode in a second stream.

My improved conduit or liner comprises a comparatively thin-walled metallic tube 20, preferably made of copper, brass or other non-corrosive material. Extending longitudinally through the tube is a partition or wall 21, comprising an elongated metallic strip. This strip may likewise be formed of a non-ferrous material to eliminate corrosion. In manufacturing the assembly, one end of the elongated strip is inserted in one end of the tube and the strip is slid lengthwise therethrough. The strip 21 is of such height as to frictionally engage opposite regions of the tube and fit snugly therein. This partition or strip 21 divides the tube into two longitudinally extending passageways. The diameter of the tube is such that the assembled tube may be readily slid into the passageway into the tool and yet when in position will frictionally engage the walls of the passageway, fitting snugly therein to thereby permit the cooling of the frame itself when the fluid passes through the conduit. In the preferred form the tube and the partition are assembled in straight form and are subsequently bent as a unit to any desired curvature.

The two passageways 25 and 26 are continued to a point adjacent the tip of the electrode 11 by a tongue-like partition 40 which is inserted in the opening 12 in the electrode in alignment with the tube partition 21, thus forming a continuation of such partition.

Many times it is advisable to provide the frame members with a passageway which departs from a straight line, as indicated in Fig. 1. This is sometimes done to attain the greatest possible structural advantages in the casting, or to bring the outlet of the passageway to a region of the frame least affected by the heat of the electrode. To permit the use of my improved conduit in such instances, I prefer to make both the tube 20 of a bendable material and the partition of a material which will permit it to be bent in the plane of the partition as indicated in the drawing. I find that a comparatively soft brass or copper provides such a material. However, soft steel or iron may be used when extreme bending of the conduit is not required. When the passageway 14 is formed, as shown in Fig. 1, my improved conduit which is preferably made in a straight length, bends to conform with the curvature of the passageways as it is inserted therein.

After the conduit has been positioned in the passageway in the tool, the frame may be drilled to provide two passageways 30 and 31 which intersect respective passageways of my improved conduit, permitting supply conduits 33 and 34 to be connected therewith, as shown in Fig. 2. The outer end of the passageway 14 may then be sealed with a suitable plug 35, which also serves to close the end of the conduit 20.

From the foregoing description it will be seen that I have provided an improved conduit having two longitudinal passageways therein, which conduit is especially adapted for use in welding mechanisms and which requires but one opening in the casting. Further, my improved conduit insures unobstructed passage of the cooling fluid which otherwise might be caused by corrosion or other similar action, and at the same time provides a maximum cooling of the casting through which the conduit passes.

While I have described my improved conduit in connection with a welding mechanism, it is obvious that the conduit may be put to many other uses in which a single tube is desired for providing two longitudinally extending passageways.

I claim:

1. A method of lining a curved passageway in a porous one-piece casting and simultaneously forming a bi-passage fluid conduit therein, comprising forming said casting with a curved, elongated passageway therein, taking an open-ended tube of substantially the same external diameter as the internal diameter of the passageway, said tube being of substantially the same length as the length of the passageway, and inserting through the open end thereof an elongated partition strip of material of substantially the length of the tube, the said strip having a width that is substantially equal to the internal diameter of the tube, whereby the strip remains in self-supporting position within the conduit solely by frictional engagement between the longitudinal edges of the strip and the wall of the conduit, and inserting the assembled tube endwise into the passageway to bend the tube and partition as a unit while maintaining the partition edges in contact with the walls of the tubing throughout the length of the strip.

2. A method of lining a curved passageway in a porous one-piece casting and simultaneously forming a bi-passage fluid conduit therein, comprising forming said casting with a curved, elongated passageway therein, taking an open-ended tube of substantially the same external diameter as the internal diameter of the passageway, said tube being of substantially the same length as the length of the passageway and having therein an elongated partition strip of material of substantially the length of the tube, the said strip having a width that is substantially equal to the internal diameter of the tube, whereby the strip remains in self-supporting position within the conduit solely by frictional engagement between the longitudinal edges of the strip and the wall of the conduit, and inserting the assembled tube endwise into the passageway to bend the tube and partition as a unit while maintaining the partition edges in contact with the walls of the tubing throughout the length of the strip.

MERIL L. ECKMAN.